July 28, 1936.
A. ERICKSON
2,049,360
WIND SPEED INDICATOR
Filed May 7, 1935
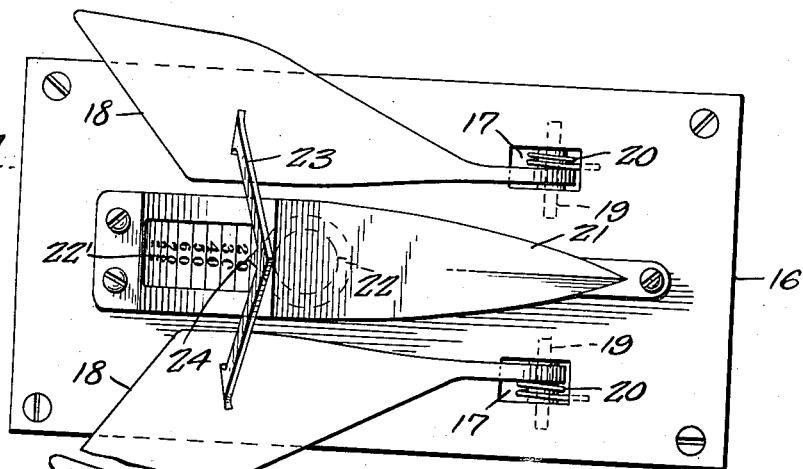
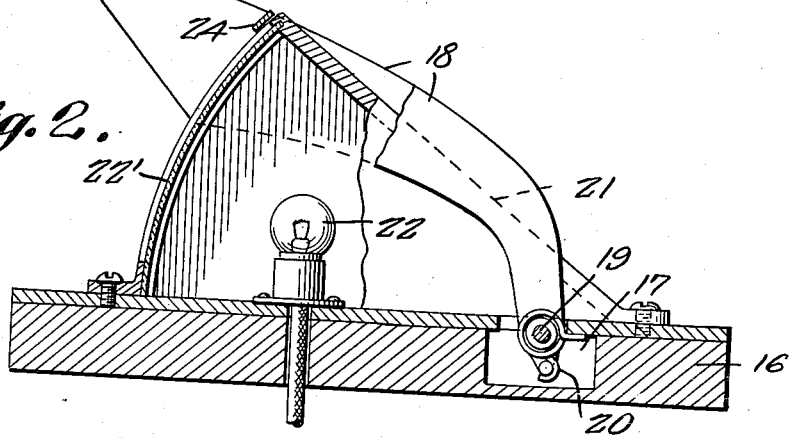
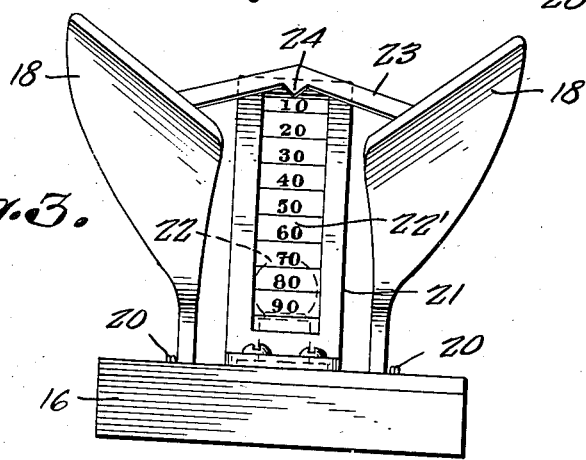
Arthur Erickson, INVENTOR
BY Victor J. Evans & Co.
ATTORNEY Patented July 28, 1936

2,049,360

UNITED STATES PATENT OFFICE 2,049,360

WIND SPEED INDICATOR

Arthur Erickson, Alma Center, Wis.

Application May 7, 1935, Serial No. 20,279

1 Claim. (Cl. 265—23)

This invention relates to an air resistance indicator especially adapted to motor vehicles and similar devices for indicating and determining the velocity of headwinds or air currents during the travel of said vehicle, and has for the primary object the provision of a device of this character which is simple, durable and efficient and which may be readily installed to a vehicle and may be manufactured and sold at a low cost.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a top plan view, illustrating a gauge constructed in accordance with my invention.

Figure 2 is a vertical sectional view illustrating the same.

Figure 3 is an end view illustrating the device.

Referring in detail to the drawing, the numeral 16 indicates a base of any suitable design and has located therein spaced chambers 17 opening outwardly through the top face of the base to receive the forward ends of wings 18. Secured to the base and traversing the chambers are pintles 19 on which the wings 18 are journaled. The wings extend upwardly and rearwardly from the chambers and the journaled ends thereof are connected to coil springs 20. The coil springs are mounted upon the pintles with one end connected with the wings and the other end engaging with the base. The springs act to urge the wings 18 upwardly while the wind currents act upon said wings to move them downwardly against the action of the springs.

A housing 21 is removably secured to the base and is located between the wings and has formed in its rear wall a window closed by a transparent panel 22' bearing a scale. Electric illuminating means 22 is located in the housing. A combined brace and indicator 23 connects the wings and has a projection or pointer 24 to move over the scale in accordance with the wind or air currents acting on the wings against the action of the springs. The scale and indicator face rearwardly of the device so that when the device is mounted to the forward portion of a motor vehicle, the occupant of the vehicle can readily notice the movement of the indicator over the scale, the latter being illuminated by the means 22.

Having described the invention, I claim:

A device of the character set forth comprising a base having spaced chambers, wings extending into said chambers and journaled therein and extending from the chambers in an upward and rearward direction, spring means connected to the journaled ends of the wings to act to urge said wings upwardly, a casing secured to said base between the wings and having a window in its rear wall, a transparent panel closing said window and having a scale thereon, illuminating means in said casing, and a combined brace and indicator connecting the wings and movable over the scale by wind currents acting on said wings to force them downwardly against the action of the springs.

ARTHUR ERICKSON.